United States Patent
Singh et al.

(10) Patent No.: US 12,516,926 B2
(45) Date of Patent: Jan. 6, 2026

(54) SYSTEM AND METHOD FOR SENSING TOPOLOGY OF A PLANET

(71) Applicant: GALAXEYE SPACE SOLUTIONS PRIVATE LIMITED, Chennai (IN)

(72) Inventors: Suyash Singh, Chennai (IN); Denil Chawda, Chennai (IN); Kishan Thakkar, Chennai (IN); Rakshit Bhatt, Chennai (IN); Pranit Mehta, Chennai (IN)

(73) Assignee: Galaxeye Space Solutions Private Limited, Gujarat (IN)

( * ) Notice: Subject to any disclaimer, the term of this patent is extended or adjusted under 35 U.S.C. 154(b) by 182 days.

(21) Appl. No.: 18/578,643

(22) PCT Filed: May 11, 2022

(86) PCT No.: PCT/IN2022/050460
§ 371 (c)(1),
(2) Date: Jan. 11, 2024

(87) PCT Pub. No.: WO2023/286075
PCT Pub. Date: Jan. 19, 2023

(65) Prior Publication Data
US 2024/0337482 A1     Oct. 10, 2024

(30) Foreign Application Priority Data
Jul. 12, 2021   (IN) .............. 202141031282

(51) Int. Cl.
*G01B 11/30*      (2006.01)
*G01B 15/08*      (2006.01)
*G01C 11/02*      (2006.01)
*G01C 15/00*      (2006.01)
(Continued)

(52) U.S. Cl.
CPC ............ *G01B 11/303* (2013.01); *G01B 15/08* (2013.01); *G01C 11/02* (2013.01); *G01C 15/00* (2013.01); *G06V 10/44* (2022.01); *G06F 18/251* (2023.01)

(58) Field of Classification Search
CPC ...... G01B 11/303; G01B 15/08; G01C 11/02; G01C 15/00; G06F 18/251; G06V 10/44
See application file for complete search history.

(56) References Cited

U.S. PATENT DOCUMENTS 10,060,741 B2 *   8/2018   Clark ................ G01C 7/04
2019/0162551 A1 *  5/2019   Kean ............ G01C 21/3647

* cited by examiner

*Primary Examiner* — Mark R Gaworecki
(74) *Attorney, Agent, or Firm* — Fish & Richardson P.C.

(57) ABSTRACT

A sensor system for sensing topography of a planet is disclosed herein. The system comprises at least one on-board processor. The system further comprises at least one first and second configured on a vehicle moving at a height from a crust portion of the planet for sensing the topography of a sample area of the planet. The sensors are communicatively coupled to the on-board processor. The system comprises a memory communicatively coupled to the on-board processor, wherein the memory stores executable instructions that, when executed by the processor, cause the processor to facilitate synchronized and aligned orientation of the sensors in a direction towards the sample area for sensing spatially and temporally matched datasets. The processor then receives and processes the spatially and temporally matched datasets to achieve pixel level co-registration thereof.

10 Claims, 5 Drawing Sheets

(51) Int. Cl.
*G06F 18/25* (2023.01)
*G06V 10/44* (2022.01)

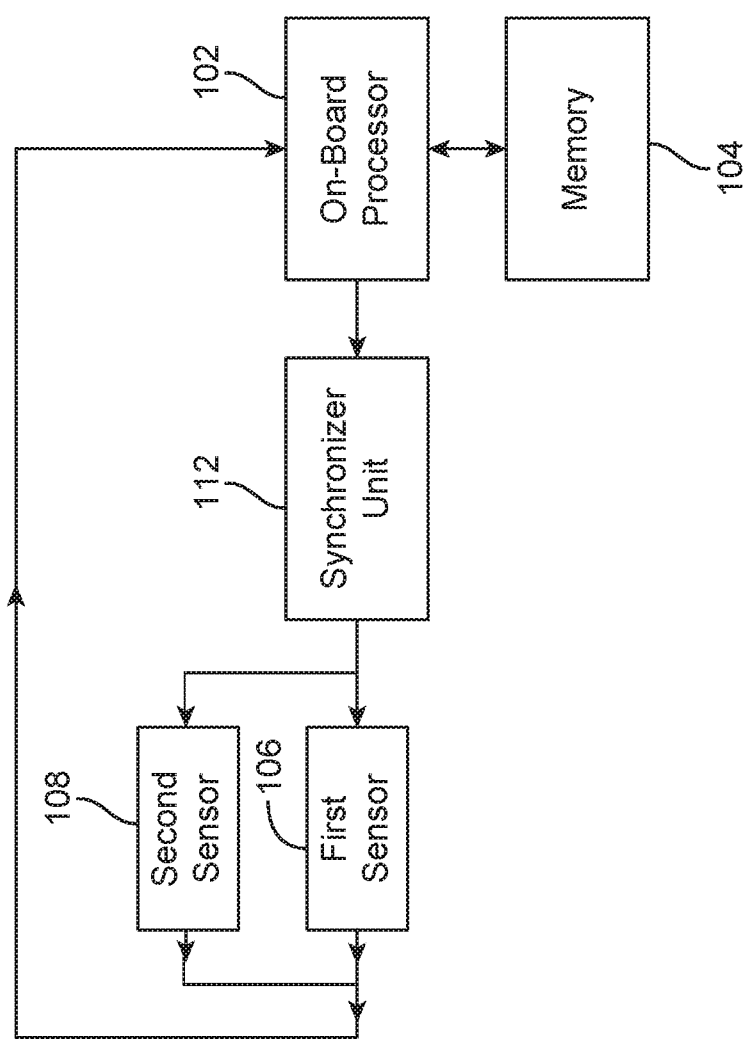

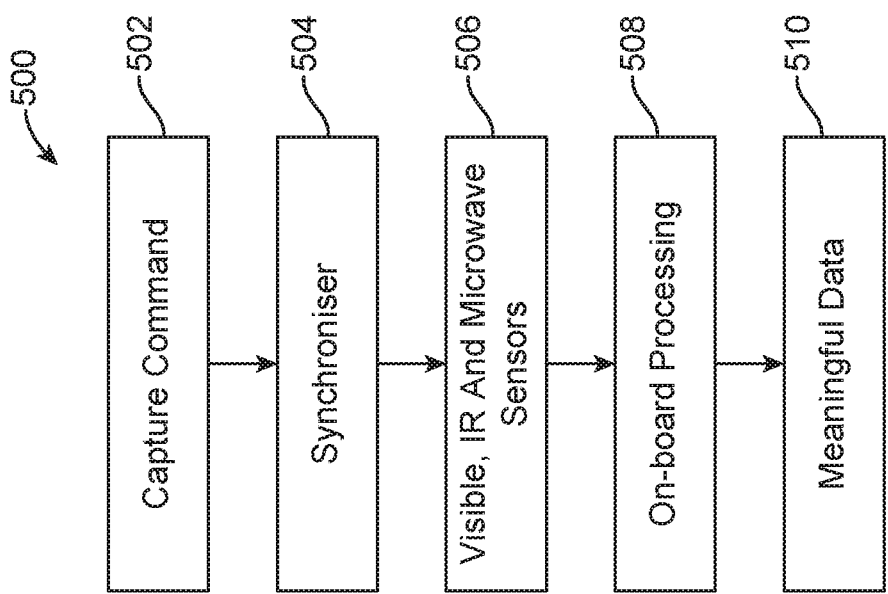

SYSTEM AND METHOD FOR SENSING TOPOLOGY OF A PLANET

TECHNICAL FIELD

The present subject matter relates to the field of sensors. In particular, the present subject matter relates to a sensor system for sensing the topology of a planet.

BACKGROUND

The present disclosure relates to technologies in place for Earth Observation & Remote Sensing. Currently, there are two sensors that are largely used to get details about the object being sensed. The first sensor is an optical sensor, which may be Multispectral sensor or hyperspectral sensor according one example. The optical sensor is a passive sensor, requiring an external source of radiation, like the sunlight, to be able to acquire data. As a result, they can acquire data only during daytime over areas that do not have a significant cloud cover. Given a global average cloud cover of at least 50% any time of the year, an optical sensor can acquire data only during clear day, and not cloud day, clear night or cloudy night, thus allowing only for 25% usage of the potential. Working in the Visible & Infrared region of the EM Spectrum, they can sense colour of the object being sensed, and some infrared-based properties. However, they are not sufficiently sensitive than other active sensors to the geometry of the object.

The second type of sensor used is microwave sensor (Radar Sensor). This is an active sensor, i.e., it sends its own radiation and captures it back, instead of depending on an external source of radiation, like the sunlight. As a result, they can acquire data irrespective of the time of day and weather, not being blocked by clouds. While working in the Microwave region of the EM Spectrum, they can sense the returning waves, which vary based on the geometry of the object being sensed. Another key point about the convention sensors is that they are insensitive to color.

Understanding the arts in the industry, the limitations have also been explained in the above paragraphs. A lot of research has been done on comparing these two datasets. Diving deeper into the comparison and the sensor properties, there is growing adaptation of seeing these two datasets more as complementary than competing datasets. As a result, this has triggered a new field of Data Fusion and Co-registration of both these datasets, to extract further insights. Broadly, there are three levels of fusing both the sensor data-Decision-level, Feature-level, and Pixel-level. Decision-level Fusion treats both these as distinct datasets, and performs individual processing, just combining the final insights from both of these, at the report level. This is more like a macro level of fusion, not focusing on a lot of details. Feature-level Fusion combines pixels in each of these datasets individually, and then fuse the features and objects such as object area, edges, etc. This compromises on minute details in the individual datasets. In pixel-level fusion, raw data of both these sensors are co-registered and fused to generate a data cube. Individual layer of this dataset are fused to generate a new dataset.

The current problem occurs when trying to approach Pixel-level data fusion. Currently, the raw data acquired for both the sensors comes from distinct sources, each of them having their own technical specifications and parameters. Further, given how differently both the sensors operate, it is challenging to co-register these datasets, when obtained from different sources, thus leading to a lot of errors. As a result, the overall process, as of today, consumes a lot of time and effort, while still being limited in terms of the accuracy obtained, as a result of the Data Fusion.

SUMMARY

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

The present subject matter envisages a sensor system for sensing topography of a planet. The system comprises at least one on-board processor. The system further comprises at least one first sensor and at least one second sensor configured on at least one vehicle moving at a height from a crust portion of the planet for sensing the topography of a sample area of the planet. The at least one first and second sensor is communicatively coupled to the at least one on-board processor. The system further comprises at least one memory communicatively coupled to the at least one on-board processor and storing executable instructions that, when executed by the processor, cause the computer processor to facilitate synchronized and aligned orientation of the at least one first sensor and the at least one second sensor in a direction towards the sample area for sensing spatially and temporally matched datasets, wherein the synchronized and aligned orientation of the at least one first sensor and the at least one second sensor is facilitated via a synchronizer unit communicatively coupled to the processor; and receiving and processing the spatially and temporally matched datasets for achieving pixel level co-registration of the spatially and temporally matched datasets.

In an exemplary non-limiting embodiment, the at least one first includes an optical sensor and an infrared sensor, and the at least one second sensor includes a microwave sensor.

In an exemplary non-limiting embodiment, the vehicle is one of a spacecraft, an aircraft, and a satellite.

In an exemplary non-limiting embodiment, the beam-centers of the first sensor and the second sensor in a cross-track direction are aligned.

In an exemplary non-limiting embodiment, a number of pixels in a dataset of the optical sensor and infrared sensor is a multiple of a number of pixels in a dataset of the microwave sensors.

In an exemplary non-limiting embodiment, the synchronizer unit comprises a synchronizer control unit and at least one motion sensor communicatively coupled to the synchronizer control unit. The one motion sensor is also coupled to the at least one first sensor and the at least one second sensor for detecting the positions thereof. The synchronizer unit further comprises at least one actuator communicatively coupled to the synchronizer control unit, and the at least one actuator is also coupled to the at least one first sensor and the at least one second sensor for facilitating the synchronized and aligned orientation of the at least one first sensor and the at least one second sensor in a direction towards the sample area for sensing spatially and temporally matched datasets.

In an exemplary non-limiting embodiment, the at least one first sensor and the at least one second sensor are configured on at least a single vehicle. The present subject matter also envisages a method for sensing a topology of the planet.

These and other objects, features, and advantages of the present invention will become more readily apparent from the attached drawings and the detailed description of the preferred embodiments, which follow.

BRIEF DESCRIPTION OF DRAWING

The present subject matter is hereinafter described with reference to non-limiting accompanying drawing in which:

FIG. 1A illustrates a block diagram from a sensor system for sensing topology of a planet, in accordance with one embodiment of the present subject matter.

FIG. 4 illustrates a block diagram depicting the steps involved in a method of sensing the topology of the planet, in accordance with an embodiment of the present subject matter.

DETAILED DESCRIPTION

Figure 1B:
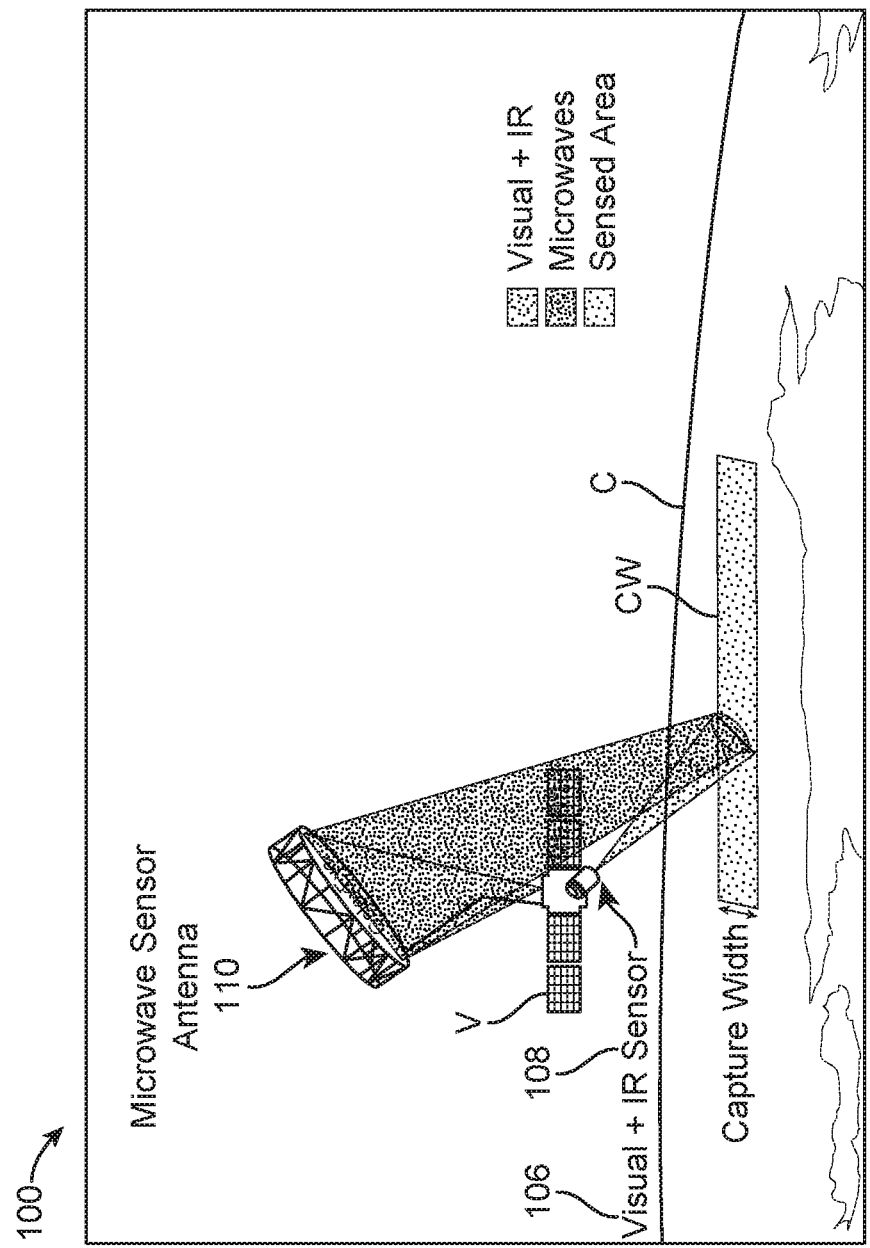
FIG. 1B illustrates a schematic view of an exemplary embodiment of the sensor system for sensing topology of a planet of FIG. 1A.

As mentioned in the previous sections of the present document, currently, the raw data acquired by the optical sensor and the microwave sensors come from distinct sources, where each of them has their own technical specifications and parameters. Further, given how differently both the sensors operate, it is challenging to co-register these datasets, when obtained from different distinct sources, thus leading to a lot of errors. As a result, the overall process, currently, consumes a lot of time and efforts, while still being limited in terms of the accuracy obtained as a result of the data fusion.

To overcome the aforementioned matter, the present subject matter envisages a sensor system for sensing the topology of a planet that involves the usage of two different sensors equipped with optical sensing, infrared sensing, and microwave sensing that are synchronized, aligned, and configured to operate simultaneously. Furthermore, the three sensors are configured for sensing a sample area of the topology to capture spatially and temporally matched datasets associated with the characteristics of the sample area.

FIG. 1A illustrates a block diagram depicting the principle of operation of a sensor system for sensing the topology of a planet 100 (hereinafter referred to as system 100), in accordance with an embodiment of the present subject matter. The system 100 comprises at least one on-board processor 102 and a memory 104 communicatively coupled to the at least one on-board processor, the memory storing executable instructions for operation of the system 100. The system 100 further comprises at least one first sensor 106 and at least one second sensor 108. The first sensors 106 and the second sensor 108 are communicatively coupled to the on-board processor 102 (hereinafter interchangeably referred to as processor 102).

The system 100 further comprises a synchronizer unit 112 that is communicatively coupled to the processor 102 and the first and second sensors 106, 108. The synchronizer unit 112 is configured to receive instructions of the processor 102 to facilitate synchronized alignment of the first and second sensors 106, 108. In one embodiment, the synchronizer unit 112 is also configured to initiate simultaneous operation of the first and second sensors 106, 108. In one embodiment, the at least one first sensor 106 an optical sensor and an infrared sensor, and the at least one second sensor 108 includes a microwave sensor. As can appreciated, the system 100 includes an additional sensing feature, which is the infrared sensing as compared to the conventional sensor systems discussed in the background section of the present document. Furthermore, the synchronizer unit 112 facilitates the simultaneous operation and synchronized alignment of the first and second sensors 106, 108 towards the sample area of the topology under observation.

In pixel level fusion, the corresponding pixels in both the datasets are combined using certain mathematical operations to generate new pixels which are more informative. In order to achieve a high-quality pixel level fusion, both the datasets need to be spatially and temporally aligned so that any pixel in one dataset overlaps as well as possible to the corresponding pixel in the other dataset. Such spatially and temporally aligned datasets are called co-registered datasets.

Thus, co-registration is the process where the dataset obtained from both the sensors are spatially and temporally matched with each other, because of which, corresponding pixels in both the datasets point at the same object in the sampled area. This is what enables the possibility of pixel level fusion, where the corresponding pixels from both the datasets are combined. In case of decision level or feature level fusion, co-registration is not a necessity, as they do not simultaneously interact with the pixels of both datasets. As previously explained, this leads to compromise on the intricacies and minor details which could be seen only at the pixel level. For example, when mapping ships in the sea, decision level fusion will just compare the facts that dataset one and dataset two have mapped so many number of ships in the sea. Feature level fusion will compare the data obtained of different features in the image, e.g., each ship will be mapped correspondingly to the other dataset and give details about its location. Pixel level fusion gives a lot more details about the area and features, with each pixel being mapped correspondingly to the other dataset. This results in coming up with insights like the size and volume of each ship, number of containers present, etc. Thus, we see that pixel level fusion enables new information that can be accessed, and thus new insights that can be derived.

FIG. 1B illustrates a schematic view of an exemplary embodiment of the system 100, in accordance with the present subject matter. As seen in FIG. 1B, the sensors 106, 108 are mounted on a vehicle V at a height from the crust C of the planet. It can be seen in FIG. 1B that the sensors 106, 108 are aligned to simultaneously sense the topology of the planet.

Figure 2:
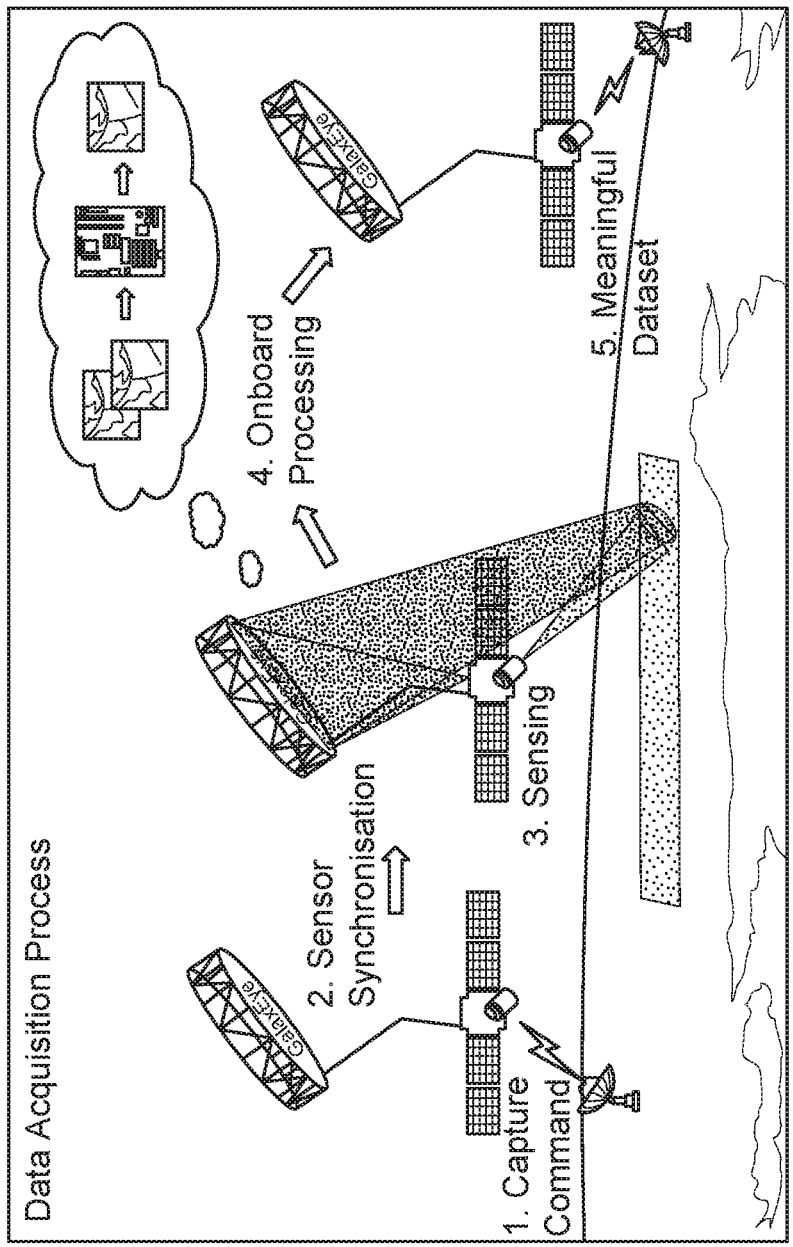
FIG. 2 illustrates a schematic view of different steps involved in the operation of the exemplary embodiment of the sensor system for sensing topology of a planet of FIG. 1B.

FIG. 2 illustrates a schematic view of an exemplary embodiment of the system 100, in accordance with the present subject matter. Reference hereinafter is directed to FIG. 1 and FIG. 2. A first step to trigger the operation of the system 100 is to instruct the on-board processor 102 that an observation of a particular sample area is requested. Once the on-board processor 102 receives the instructions, the on-board processor 102 triggers the synchronization of the first and second sensors 106, 108 via the synchronizer unit 112. As mentioned previously, the synchronizer unit 112 may be configured to facilitate simultaneous operation along with synchronized alignment of the first, the second sensors 106, 108 towards the sample area of the topology under observation.

In one embodiment, as seen in FIG. 2, the beam-centers of the first sensor 106 and the second sensor 108 in a cross-track direction are aligned, and the data collection starts simultaneously. An advantageous aspect of such a feature is that it facilitates the obtainment of spatially and temporally matched datasets of the required parameters. In accordance with another embodiment, the number of pixels in the first sensor 106 (optical sensor and infrared sensor) datasets is a multiple of number of pixels in the microwave sensor dataset for facilitating smooth pixel level co-registration of the datasets. In accordance with yet another embodiment, an advantageous aspect of the having simultaneous operation of the first and second sensors 106, 108 along with the synchronized alignment is that it allows capturing of pixels that are matched in time stamps and azimuth elements, which eventually facilitates smooth pixel level co-registration of the different datasets of the two sensors.

In accordance with one embodiment, the first and second sensors 106, 108 are configured on at least one of an aircraft, a spacecraft, and a satellite. More specifically, the first and second sensors 106, 108 may be mounted on any vehicle that can move at a height from the crust of the planet.

Referring back to FIG. 2, once the first and second sensors 106, 108 capture the spatially and temporally matching datasets, the same are then received and processed by the on-board processor 102. As mentioned previously, the processor 102 facilitates the processing of the datasets for achieving a pixel level co-registration of datasets obtained by the two different sensors configured for optical sensing, infrared sensing, and microwave sensing. The pixel level co-registration of the datasets facilitates a more efficient post-processing for obtaining meaningful datasets that are more accurate as compared to the conventional systems.

Figure 3:
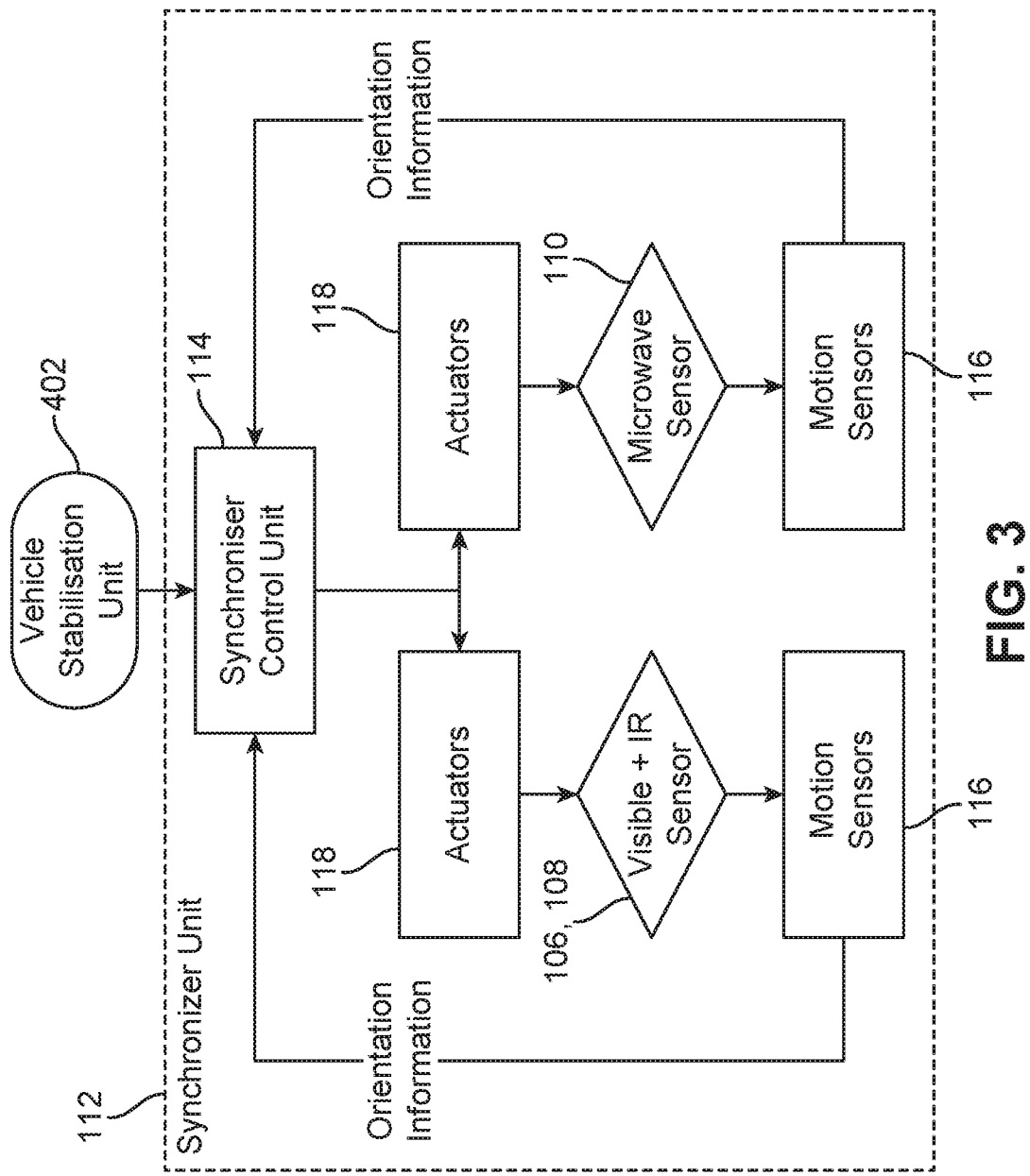
FIG. 3 illustrates a block diagram of a synchronizer unit used in the sensor system for sensing the topology of the planet, in accordance with one embodiment of the present subject matter.

FIG. 3 illustrates a schematic view of the synchronizer unit 112 of used in the system 100, in accordance with an embodiment of the present subject matter. The synchronizer unit 112, in accordance with an embodiment of the present subject matter, comprises a synchronizer control unit 114. At least one motion sensor 116 is communicatively coupled to the synchronizer control unit 114 and the first and second sensors 106, 108 for detecting the positions thereof. The synchronizer unit 112 further comprises at least one actuator 118 communicatively coupled to the synchronizer control unit 114. The actuators 118 are also coupled to the first and second sensors 106, 108 for facilitating the synchronized and aligned orientation thereof in a direction towards the sample area for sensing spatially and temporally matched datasets.

The motion sensors 116 are configured to detect the exact positions of sensors 106, 108. The information regarding the positions is fed back to the synchronizer control unit 114 as a feedback based on which the synchronizer control unit 114 controls the actuator 118 for facilitating the synchronized and aligned orientation of the first and second sensors 106, 108.

It is to be noted that the synchronizer control unit 114 is also communicatively coupled to a vehicle stabilization unit 402 of a vehicle on which the system 100 may be installed. This ensures that the synchronizer control unit 114 not only takes into account the positions of the sensors but also the position of the vehicle while facilitating the synchronized and aligned orientation of the first and second sensors 106, 108 towards the desired sample area.

FIG. 4 depicts a block diagram depicting the method of sensing topography of a planet 500 (hereinafter referred to as method 500), in accordance with an embodiment of the present subject matter. Referring to FIG. 5, at block 502, the method includes the step of receiving a capture command. In an embodiment, the capture command is received via the on-board processor 102. The capture command may be provided to the on-board processor 102 via a remote server that may be set up on the ground or by an internal trigger logic provided in the on-board processor 102 or by on-board personnel present in the vehicle on which the system 100 is installed.

At block 504, the method 500 includes the step of activating the synchronizer unit. More specifically, at least one first sensor and at least one second sensor are configured on at least one vehicle moving at a height from a crust portion of the planet for sensing the topography of a sample area of the planet. The step of activating the synchronizer unit includes facilitating synchronized and aligned orientation of the at least one first sensor and the at least one second sensor in a direction towards the sample area for sensing spatially and temporally matched datasets.

At block 506, the method 500 includes simultaneously activating the operation of the visible sensor (also referred to as optical sensor, infrared sensor, and first sensor) and the microwave sensor (also referred to as the second sensor) for obtaining spatially and temporally matched datasets.

At block 508, the method 500 includes the step of receiving and processing the spatially and temporally matched datasets for achieving pixel level co-registration of the spatially and temporally matched datasets as seen in block 510. In accordance with one embodiment of the present subject matter, this step is performed by the on-board processor 102 of the system 100.

As can be gathered from the description thus far, the system 100 facilitates pixel level co-registration of the datasets obtained by the first and second sensors 106, 108. Furthermore, the system 100 takes advantage of the complementary nature of the individual sensors and combines individual datasets of the two sensors for achieving smooth pixel level co-registration of the datasets obtained by the first and second sensors.

An advantageous aspect of the system 100 is that housing the individual sensors in a common system facilitates data acquisition over the same place, "at the same time". This is currently not possible as the individual sensor datasets currently come from different sources. As a result, the integrity and consistency of the datasets are maintained.

It is to be noted that the optical sensor 106 cannot sense through clouds, and as such, a lot of the acquired data becomes meaningless due to the presence of the cloud cover in the data acquired. Typically, any dataset with over 10% cloud cover is not used for data processing, analytics, and insights. Therefore, using the radar sensor 110 and the infrared sensing feature of the first sensor, data can be acquired even during cloudy weather, and the 10% cloud cover threshold can be pushed further, thus increasing the potential of dealing with higher cloud cover. As a result, the amount of meaningful data being captured increases significantly.

The system 100, in accordance with embodiments of the present subject matter, has various applications that leverage Earth Observation and Remote Sensing. The applications of the system 100 can broadly be classified into three use cases: asset detection, asset monitoring (inspection/tracking), and change detection. These three use cases can be applied to various industries, including but not limited to agriculture, real estate, utilities, defence, finance, supply chain, mining, infrastructure, disaster management etc. While optical data is widely used for visual understanding of the area of interest, radar data helps unlock deeper insights that would not be possible to obtain from optical data. The new dataset can be used to capture both color and geometry of the objects being sensed, thus giving a better perspective of the sample area of interest.

In case of agriculture, the system 100 can be used to generate the pixel level co-registration of datasets may assist in detecting the type of soil (e.g., color) and also the moisture content of the soil, thus helping formulate a fertilization and irrigation protocol suitable for the sample area of interest.

Yet another application of the system 100 may be in forest mapping. The pixel level co-registration of datasets may facilitate monitoring the forestry type (shape of trees) and vegetation health (based on color of leaves), thereby helping in tracking a level of deforestation in a sample area of interest.

One more application of the system 100 may be the detection and mapping of camouflaged objects within a sample area of interest. The pixel level co-registration of datasets obtained by sensors 106, 108 may also prove beneficial in mapping camouflaged objects, which is a limitation with optical sensor when used in isolation. In most cases, the radar sensor can point out abnormalities in the area despite camouflage, but not exactly explain much about the object. A real time example is from Africa, where the water management system in rural settlement areas was planned based on this application. The residences were a mix of houses with roofs made of metal sheet, and those made of thatched grass. The latter camouflaged with the ground, but the former was picked up by the Radar sensor. Having picked these points, a detailed acquisition using Optical sensor over these areas gave an idea about the population and the area covered. This saved a lot of time, money, and efforts, as compared to doing a manual ground check over the areas. Radar sensors also have the capability to detect underground water levels. The new dataset obtained by the system 100 would thus be able to give a visual map of the area, with the underground water levels at that specific location. Doing this with data obtained from the conventional sources would come with a lot of errors and complexity, as already explained earlier.

Different characteristics and beneficial particulars are unfolded fully with reference to the embodiments/aspects which are exemplified in the accompanying drawing and detailed in the preceding description. Descriptions of techniques, methods, components, and equipment that a person skilled in the art is well aware of or those form common general knowledge in the field pertaining to the present subject matter is not described and/or introduced for the purpose of focusing on the present subject matter and not to obscure the present subject matter and advantageous features thereof. At the same time the present subject matter and its features that are explained herein in the detailed description and the specific examples, are given by way of illustration only, and not by way of limitation. It is to be understood that a person skilled in the art may and can think of various alternative substitutions, modifications, additions, and/or rearrangements which are considered to be within the spirit and/or scope of the underlying inventive concept.

In the present specification the word "comprise", or variations thereof, such as "comprises" or "comprising", imply the inclusion of a stated element, integer or step, or group of elements, integers or steps, but not the exclusion of any other element, integer or step, or group of elements, integers or steps.

Further, the use of the expression "at least" or "at least one" suggests the use of one or more elements or ingredients or quantities, as the use can be in the embodiment of the invention to achieve one or more of the desired objects or results.

We claim:

1. A sensor system for sensing topography of a planet, the system comprising:
    at least one on-board processor;
    at least one first sensor and at least one second sensor configured on at least one vehicle moving at a height from a crust portion of the planet for sensing the topography of a sample area of the planet, the at least one first and second sensor being communicatively coupled to the at least one on-board processor;
    at least one memory communicatively coupled to the at least one on-board processor, the memory storing executable instructions that, when executed by the processor, cause the computer processor to:
    facilitate synchronized and aligned orientation of the at least one first sensor and the at least one second sensor in a direction towards the sample area for sensing spatially and temporally matched datasets, wherein the synchronized and aligned orientation of the at least one first sensor and the at least one second sensor is facilitated via a synchronizer unit communicatively coupled to the processor; and
    receiving and processing the spatially and temporally matched datasets for achieving pixel level co-registration of the spatially and temporally matched datasets.

2. The sensor system as claimed in claim 1, wherein the at least one first includes an optical sensor and an infrared sensor, and the at least one second sensor includes a microwave sensor.

3. The sensor system as claimed in claim 1, wherein the vehicle is one of a spacecraft, an aircraft, and a satellite.

4. The sensor system as claimed in claim 2, wherein the beam-centers of the first sensor and the second sensor in a cross-track direction are aligned.

5. The sensor system as claimed in claim 2, wherein a number of pixels in a dataset of the optical sensor and infrared sensor is a multiple of a number of pixels in a dataset of the microwave sensors.

6. The sensor system as claimed in claim 1, wherein the synchronizer unit comprises:
    a synchronizer control unit;
    at least one motion sensor communicatively coupled to the synchronizer control unit, the at least one motion sensor coupled to the at least one first sensor and the at least one second sensor for detecting the positions thereof; and
    at least one actuator communicatively coupled to the synchronizer control unit, the at least one actuator coupled to the at least one first sensor and the at least one second sensor for facilitating the synchronized and aligned orientation of the at least one first sensor and the at least one second sensor in a direction towards the sample area for sensing spatially and temporally matched datasets.

7. The sensor system as claimed in claim 1, wherein the at least one first sensor and the at least one second are configured on at least a single vehicle.

8. A method for sensing a topology of the planet comprising:
- configuring at least one first sensor and at least one second sensor configured on at least one vehicle moving at a height from a crust portion of the planet for sensing the topography of a sample area of the planet;
- facilitating synchronized and aligned orientation of the at least one first sensor and the at least one second sensor in a direction towards the sample area for sensing spatially and temporally matched datasets;
- receiving and processing the spatially and temporally matched datasets for generating pixel level co-registered datasets corresponding to the spatially and temporally matched datasets.

9. The sensor system as claimed in claim 8, wherein the at least one first includes an optical sensor and an infrared sensor, and the at least one second sensor includes a microwave sensor, and the beam-centers of the first sensor and the second sensor in a cross-track direction are aligned.

10. The sensor system as claimed in claim 9, wherein a number of pixels in a dataset of the optical sensor and infrared sensor is a multiple of a number of pixels in a dataset of the microwave sensors.

* * * * *